(12) United States Patent
Kim

(10) Patent No.: US 6,381,039 B1
(45) Date of Patent: Apr. 30, 2002

(54) METHOD FOR OUTGOING ABBREVIATION NUMBER LIST IN FACSIMILE

(75) Inventor: Ik-Hyun Kim, Daegukwangyeok (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/777,720

(22) Filed: Dec. 20, 1996

(30) Foreign Application Priority Data

Dec. 23, 1995 (KR) .............................. 95/55745

(51) Int. Cl.7 ................................................ H04N 1/00
(52) U.S. Cl. ........................................ 358/440; 358/405
(58) Field of Search ................................ 358/402, 405, 358/406, 407, 440; 379/100.01, 118, 119, 139

(56) References Cited

U.S. PATENT DOCUMENTS

| 4,764,951 A | * | 8/1988 | Kotani et al. ............... 379/100 |
| 4,870,503 A | * | 9/1989 | Miura ......................... 358/440 |
| 5,001,572 A | * | 3/1991 | Hashimoto et al. ......... 358/400 |
| 5,099,512 A | * | 3/1992 | Shigami ..................... 379/357 |
| 5,216,517 A | * | 6/1993 | Kinoshita et al. ........... 358/400 |
| 5,216,705 A |   | 6/1993 | Yoshida et al. ............. 379/100 |
| 5,293,256 A | * | 3/1994 | Fukushima et al. ........ 358/468 |
| 5,337,349 A |   | 8/1994 | Furohashi et al. .......... 379/100 |
| 5,404,231 A |   | 4/1995 | Bloomfield .................. 358/400 |
| 5,414,528 A |   | 5/1995 | Hatamura .................... 358/440 |
| 5,426,518 A |   | 6/1995 | Ohyanagi .................... 358/296 |
| 5,428,676 A | * | 6/1995 | Ogawa ........................ 379/100 |
| 5,459,482 A |   | 10/1995 | Orlen .......................... 345/98 |
| 5,459,581 A |   | 10/1995 | Ohyanagi .................... 358/296 |
| 5,510,907 A |   | 4/1996 | Koichi ........................ 358/434 |
| 5,583,658 A | * | 12/1996 | Takezawa et al. .......... 358/440 |

FOREIGN PATENT DOCUMENTS

| EP | 0 360 200 A2 | 3/1990 | .......... H04M/1/274 |
| EP | 0 456 260 A2 | 11/1991 | ............ H04N/1/32 |

* cited by examiner

Primary Examiner—Jerome Grant, II
(74) Attorney, Agent, or Firm—Robert E. Bushnell, Esq.

(57) ABSTRACT

A method for outgoing automatically an abbreviation dial list by a printer when either a user repeatedly inputs a non-registered number for a given number of times or when the user finishes a dialing in the midst of dialing a registered number. The method for achieving the object includes the steps of: a first detection for detecting whether it is the registered number, in case there is an input of an abbreviation dial number from the user; and a second detection for increasing a count in case it is not the registered number in the first detection step and then for detecting whether the count value is more than a given value. The abbreviation dial list can be printed when the count value is more than the given value in the second detection step.

13 Claims, 2 Drawing Sheets

METHOD FOR OUTGOING ABBREVIATION NUMBER LIST IN FACSIMILE

CLAIM OF PRIORITY

This application makes claims all benefits accruing under 35 U.S.C. §119 from an application for METHOD FOR OUTGOING ABBREVIATION NUMBER LIST IN FACSIMILE earlier filed in the Korean Industrial Property Office on Dec. 23, 1995 and there duly assigned Ser. No. 55745/1995.

BACKGROUND OF THE INVENTION

1. Field of the Invention

The present invention relates to a method and apparatus for more easily sending an abbreviation number list during a use of a facsimile machine. More particularly, the present invention relates to a method and apparatus used to facilitate finding a non-registered or lost abbreviation number when a user makes an outgoing call to a remote facsimile machine.

2. Description of the Related Art

Nowadays, a development of the communication tends towards accommodation of requirements of varied and several service functions of communication instruments. Particularly, communication using the facsimile in an office or a general home is becoming varied. One example of this trend is that of abbreviation dials.

Generally, in a facsimile machine, an abbreviation dial such as one touch dial or two touches dial is registered and we can simply dial such a registered number. A list of these registered abbreviation dial numbers can be printed as a confirmation function. In some methods for sending the abbreviation dial list, an output key of the abbreviation dial list is designated as a key in the facsimile. According to a typical order used with a typical display, the abbreviation dial list is outputted after an operation which requires several manipulations of output keys by the user. Therefore, if a user feels an urgency (in time or otherwise), this causes problems such as inconvenience.

On this matter, exemplars of the contemporary practice of the related arts include Koichi (U.S. Pat. No. 5,510,907, Facsimile Apparatus Having Urgency Message Transmission Function, Apr. 23, 1996) discussing a facsimile apparatus having a function to transmit a selected one of urgency messages to a selected one of destination stations, the urgency message transmitted and the destination station being selected by an operator at the start of an urgency message transmit procedure. Ohyanagi (U.S. Pat. No. 5,459,581, Image Communication Method And Apparatus For Recording And Printing Voice Message History Information, Oct. 17, 1995) and Ohyanagi (U.S. Pat. No. 5,426,518, Image Communication Method And Apparatus For Recording And Printing Voice Message History Information, Jun. 20, 1995) discuss a communication apparatus and method which includes a receiver for receiving voice messages, a recorder for recording a plurality of voice messages received by the receiver, a memory or storing history information indicating a history of the voice messages recorded by the recorder and a display for displaying out the history information stored in the memory. Orlen (U.S. Pat. No. 5,459,482, Facsimile Communication With An Active Addessing Display Device, Oct. 17, 1995) discusses a selective call signaling system capable of facsimile communication with a selective call receiver having an active addressing display comprising picture elements controlled by a plurality of first and second electrodes. The active addressing display comprises a controller controlling the plurality of first electrodes and the plurality of second drive signals. Hatamura (U.S. Pat. No. 5,414,528, Facsimile Machine Equipped With Appendant Information Adding Unit, May 9, 1995) discusses a facsimile machine including an appendant information adding unit for automatically preparing appendant information such as a cover page information and a call-back-message information and transmitting the information to the reception side together with he original images, whereby the appendant information is printed on a sheet to automatically prepare a cover page and/or a call-back-message page together with the original image sheets at the reception side. Bloomfield (U.S. Pat. No. 5,404,231, Sender-Based Facsimile Store And Forward Facility, Apr. 4, 1995) discusses facilities in the field of facsimile telecommunications, which includes a sender-based facsimile store and forward facility (FSAFF) which enhances facsimile communication through a public switched telephone network (PSTN) between a sender at a transmitting facsimile machine and an intended recipient at a receiving facsimile machine. From my study of these exemplars and from my general study of the contemporary practice and of the prior art, I find that there is a need for an effective method and apparatus for more easily sending an abbreviation number list during a use of a facsimile machine that uses such process and such circuitry as in the present invention.

SUMMARY OF THE INVENTION

Accordingly, an object of the present invention is to provide an improved method and apparatus for more easily sending an abbreviation number list during a use of a facsimile machine.

Another object of the present invention is to provide an improved method and apparatus being used to facilitate finding a non-registered or lost abbreviation number when a user makes a call to the other side of a facsimile process.

Another object of the present invention to provide a method for automatically sending an abbreviation dial list by a printer when either a user repeatedly inputs a non-registered number for a given number of times or the user stops dialing in the midst of dialing a registered number.

To achieve one or more of the above objects, the present invention may include the steps of: a first detection for detecting whether it is the registered number in case there is an input of an abbreviation dial number from the user; and a second detection for increasing a count in case it is not the registered number in the first detection step and for detecting whether the count value is more than a given value. The present invention may also include the step of printing the abbreviation dial list when the count value is more than the given value in the second detection step.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

In the following description, numerous specific details are set forth to provide a more thorough understanding of the present invention. It will be apparent, however, to one skilled in the art, that the present invention may be practiced without these specific details. In other instances well known circuits have not been described so as not to obscure the present invention.

Figure 1:
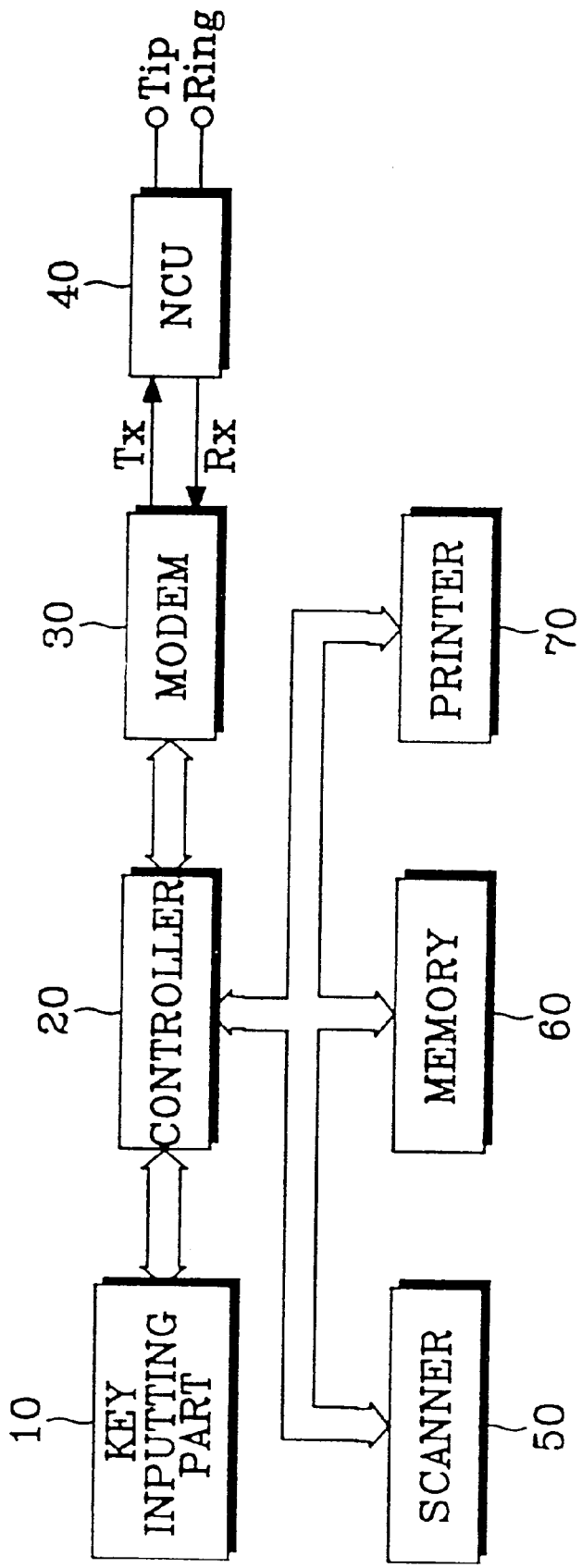
FIG. 1 is a block diagram of a facsimile machine, built in conformance with the principles of the present invention.

Turning now to the drawings, preferred embodiment of the present invention is illustrated referring to the drawings. FIG. 1 is a block diagram of a facsimile machine which includes a controller 20 having a read only memory (ROM) and a random access memory (RAM), for controlling and processing a system according to a given program. A memory 60 stores an abbreviation dial list, for accessing or storing data by a control of the controller 20. A key inputting part 10, having numerous keys, is capable of generating several kinds of key data such as that of a function determining key and of a dial key of the system, etc. The facsimile machine may also include: a scanner 50 for scanning an image of a manuscript and converting it into a digital image data, after that supplying it to the controller 20; a modulator-demodulator (MODEM) 30 being controlled by a control of the controller 20, for modulating output data of the controller 20 to analog data and outputting, and then for demodulating the analog reception data to digital data and outputting; a network control unit (NCU) 40 is operated by the control of the controller 20, constructing a phone call loop of a telephone line and interfacing signals of the MODEM 30 and the telephone line; and a printer 70 for printing reception data by a control signal of the controller 20.

Figure 2:
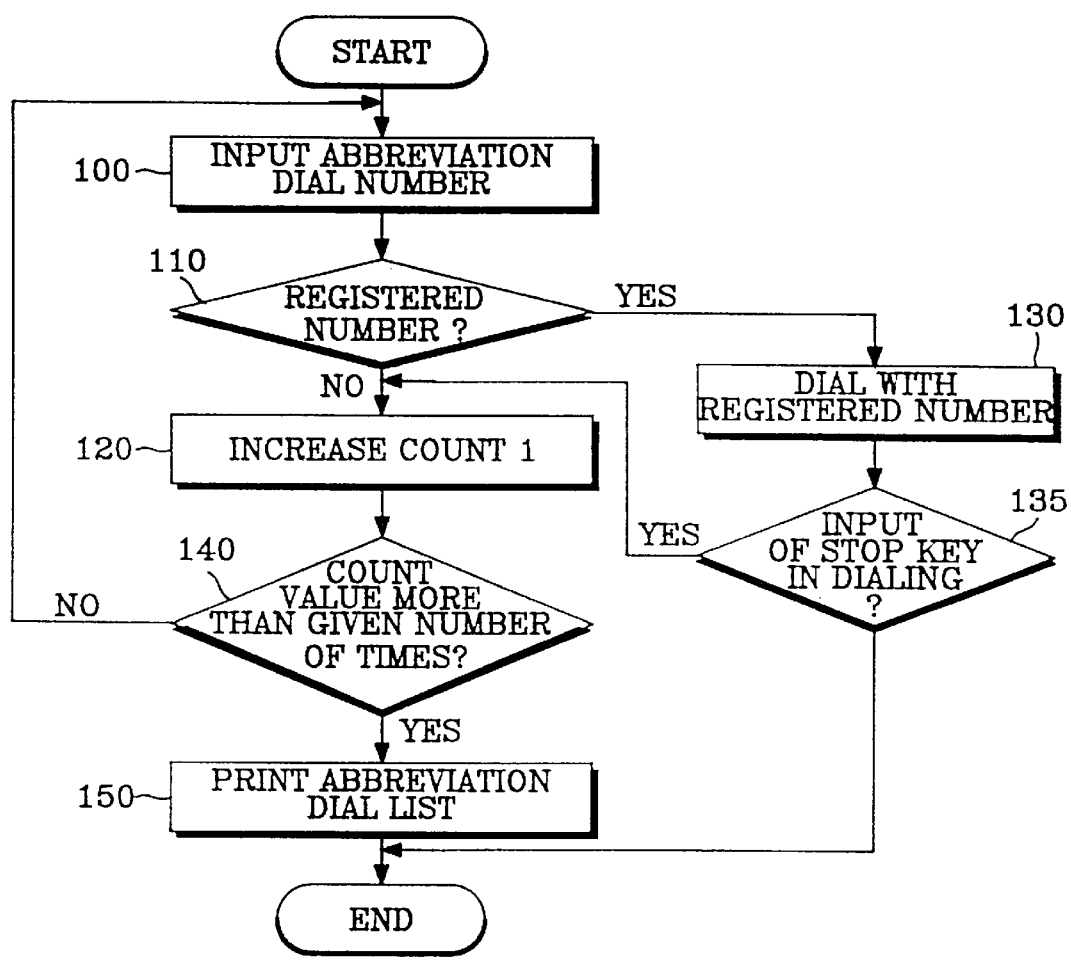
FIG. 2 is a flow chart for control of sending an abbreviation number list, functioning according to the principles of the present invention.

FIG. 2 is a control flow diagram for outgoing an abbreviation number list according to the present invention. If a wrong input of an abbreviation dial number is continued more than a given number of times, the abbreviation dial list is automatically printed. Referring to the block diagram of FIG. 1 attached to the present invention, the flow diagram of FIG. 2 is described in detail as follows. At step 100, a user inputs the abbreviation dial number through the key inputting part 10. At step 110, the controller 20 detects whether the inputted abbreviation dial number is a registered number. In case the inputted abbreviation dial number is not the registered number, in step 120 a count is increased in one. After that, at step 140 the controller 20 detects whether the increased count value is more than a given number of times. In case the increased count value is not more than the given number of times, it is fedback to the step 100 to input again the abbreviation dial number. If the increased count value is more than the given number of times, (at step 150) the controller 20 controls the printer 70 to print the abbreviation dial list, and then the program is finished. If (at step 110) the inputted abbreviation dial number is the registered number, the controller 20 (at step 130) controls a corresponding part to dial the registered number. Then at step 135, the controller 20 detects whether there is an input of a stop key in the midst of dialing by the user. If there is no input of the stop key, the dialing is continued and then the program is finished. But in case there is the input of the stop key in the midst of dialing, it is (at step 120) progressed to increase one count. Then in step 140, the controller 20 detects whether the increased count value is more than the given number of times. In case the increased count value is not more than the given number of times, it feeds back to the step 100 to input again the abbreviation dial number. If the increased count value is more than the given number of times, then (at step 150) the controller 20 controls the printer 70 to print the abbreviation dial list and then to finish the program.

As mentioned in the previous paragraphs, if either the user inputs non-registered number repeatedly in the given number of times, or the user stops the dial in the midst of dialing the registered number, the present invention provides a method for printing automatically the abbreviation dial list. Hence, in the situation of the user forgetting the abbreviation dial number, there is a convenient advantage that he can confirm the abbreviation dial number by outgoing simply the abbreviation dial list.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A process for transmitting an abbreviation number list in a facsimile system, comprising the steps of:

determining whether an abbreviated dial number corresponds to one of telephone numbers registered in said facsimile system for automatic dialing, in response to user input of said abbreviated dial number from an operational panel;

when said abbreviated dial number does not correspond to one of the telephone numbers registered in said facsimile system, successively counting each time the user input of abbreviated dial numbers not registered in said facsimile system, and automatically printing a list of registered abbreviated dial numbers with correspond telephone numbers registered in said facsimile stem for user dialing information, when a count value of the user input of the abbreviated dial numbers not registered in said facsimile system reaches a predetermined value;

when said abbreviated dial number corresponds to one of the telephone numbers registered in said facsimile system, automatically dialing a corresponding telephone number registered for said abbreviated dial number;

determining whether a stop key is input by the user from said operational panel during said dialing of the corresponding telephone number registered for said abbreviated dial number;

when said stop key is input by the user from said operational panel during said dialing of the corresponding telephone number registered for said abbreviated dial number successively counting each time the user input of said stop key from said operational panel and automatically printing a list of registered abbreviated dial numbers with corresponding telephone numbers registered in said facsimile system for user dialing information, when a count value of the user input of said stop key reaches said predetermined value.

2. A process for transmitting an abbreviation number list in a facsimile system, comprising the steps of:

when a user inputs an abbreviated dial number, determining whether said abbreviated dial number is one of telephone numbers registered in said facsimile system;

when said abbreviated dial number is not one of the telephone numbers registered in said facsimile system, increasing a count and determining whether a count value reaches a predetermined value; and when the count value reaches said predetermined value, printing said abbreviation dial list containing all registered abbreviated dial numbers with corresponding telephone numbers registered in said facsimile system for user dialing information.

3. The process of claim 2, further comprising the step of:
when said abbreviated dial number is one of the telephone numbers registered in said facsimile system, automatically dialing a corresponding telephone number registered for said abbreviated dial number.

4. The process of claim 3, further comprising the step of:
determining whether a stop key is input by the user from said operational panel during said dialing of the corresponding telephone number registered for said abbreviated dial number;
when said stop key is input by the user from said operational panel during said dialing of the corresponding telephone number registered for said abbreviated dial number, increasing a count and determining whether a count value of the user input of said stop key reaches said predetermined value; and
automatical printing said abbreviation dial list containing all registered abbreviated dial numbers with corresponding telephone numbers registered in said facsimile system for user dialing information, when said count value of the user input of said stop key reaches said predetermined value.

5. The process of claim 2, further comprising the steps of:
when said abbreviated dial number is one of the telephone numbers registered in said facsimile system, automatically dialing a corresponding telephone number registered for said abbreviated dial number;
determining whether a stop key is input by the user from said operational panel during said dialing of the corresponding telephone number registered for said abbreviated dial number;
when said stop key is input by the user from said operational panel during said dialing, increasing a count and determining whether a count value of the user input of said stop key reaches said predetermined value; and
when said count value of the user input of said stop key reaches said predetermined value, printing said abbreviation dial list of all registered abbreviated dial numbers with corresponding telephone numbers registered in said facsimile system for user dialing information.

6. A process for transmitting an abbreviation number list in a facsimile system, comprising the steps of:
when a user inputs an abbreviated dial number from an operational panel, determining whether said abbreviated dial number is one of telephone numbers registered in said facsimile system;
when said abbreviated dial number is not one of the telephone numbers registered in said facsimile system, increasing a count and determining whether a count value indicative of a number of the user input of abbreviated dial numbers not registered in said facsimile system is more than a predetermined value;
when said count value is more than said predetermined value, printing an abbreviation dial list of registered abbreviated dial numbers with corresponding telephone numbers registered in said facsimile system;
when said abbreviated dial number is one of the telephone numbers registered in said facsimile system, automatical dialing a corresponding telephone number registered for said abbreviated dial number;
determining whether a stop key is input by the user from said operational panel during said dialing of the corresponding telephone number registered for said abbreviated dial number;
when said stop key is input by the user from said operational panel during said dialing of the corresponding telephone number registered for said abbreviated dial number, increasing the count and determining whether a count value of said stop key indicative of a number of the user input of said stop key is more than said predetermined value; and
when said count value of said stop key is more than said predetermined value, printing said abbreviation dial list of registered abbreviated dial numbers with corresponding telephone numbers registered in said facsimile system for user dialing information.

7. A process for transmitting an abbreviation number list in a facsimile system, comprising the steps of:
when a user inputs an abbreviated dial number, determining whether said abbreviated dial number is one of telephone numbers registered in said facsimile system;
when said abbreviated dial number is not one of the telephone numbers registered in said facsimile system, increasing a count and determining whether a count value of the user input of abbreviated dial numbers not registered in said facsimile system is more than a predetermined value; and
when said count value of the user input of abbreviated dial numbers not registered in said facsimile system is more than said predetermined value, printing an abbreviation dial list of registered abbreviated dial numbers with corresponding telephone numbers registered in said facsimile system for user dialing information.

8. The process of claim 7, further comprising the step of:
when said abbreviated dial number is one of the telephone numbers registered in said facsimile system, automatically dialing a corresponding telephone number registered for said abbreviated dial number.

9. The process of claim 8, further determining whether a stop key is input by the user from said operational panel during said dialing of the corresponding telephone number registered for said abbreviated dial number.

10. The process of claim 9, further comprising the step of:
when said stop key is input by the user from said operational panel during said dialing of the corresponding telephone number registered for said abbreviated dial number, increasing a count and determining whether a count value of the user inputs of said stop key reaches said predetermined value; and
automatically printing said abbreviation dial list containing all registered abbreviated dial numbers with corresponding telephone numbers registered in said facsimile system for user dialing information, when said count value of the user inputs of said stop key reaches said predetermined value.

11. The process of claim 7, further comprising the steps of:
whether a stop key is input by the user from said operational panel during said dialing of the corresponding telephone number registered for said abbreviated dial number;
when said stop key is input by the user from said operational panel, increasing a count and determining whether a count value of the user inputs of said stop key is more than said predetermined value; and
when said count value of the user inputs of said stop key is more than said predetermined value, printing said abbreviation dial list of registered abbreviated dial numbers with corresponding telephone numbers registered in said facsimile system.

12. The process of claim 7, further comprising the steps of:

when a stop key is input from said operational panel during said dialing of the corresponding telephone number registered for said abbreviated dial number, increasing a count and determining whether a count value of the user inputs of said stop key is more than said predetermined value; and when said count value of the user inputs of said stop key is more than said predetermined value, printing said abbreviation dial registered abbreviate with corresponding telephone numbers registered in said facsimile system for user dialing information.

13. The process of claim 7, further comprising the steps of:

when said abbreviated dial number is one of the telephone numbers registered in said facsimile system, automatically dialing a corresponding telephone number registered for said abbreviated dial number;

when a stop key is input by the user from said operational panel during said dialing of the corresponding telephone number registered for said abbreviated dial number, increasing the count and determining whether a count value of the user inputs of said stop key is more than said predetermined value; and when said count value of the user inputs of said stop key is more than said predetermined value, printing said abbreviation dial list of registered abbreviated dial numbers with corresponding telephone numbers registered in said facsimile system for user dialing information.

* * * * *

UNITED STATES PATENT AND TRADEMARK OFFICE
CERTIFICATE OF CORRECTION

PATENT NO.     : 6,381,039 B1
DATED          : April 30, 2002
INVENTOR(S)    : Kim It is certified that error appears in the above-identified patent and that said Letters Patent is hereby corrected as shown below:

<u>Title page,</u>
Item [*] Notice, delete "0" and insert -- 675 --.

Signed and Sealed this

Fifteenth Day of July, 2003

JAMES E. ROGAN
*Director of the United States Patent and Trademark Office*